(12) United States Patent
Lei

(10) Patent No.: US 8,170,101 B2
(45) Date of Patent: May 1, 2012

(54) METHODS AND SYSTEMS FOR LOW-COMPLEXITY DATA COMPRESSION

(75) Inventor: Shawmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1446 days.

(21) Appl. No.: 11/687,538

(22) Filed: Mar. 16, 2007

(65) Prior Publication Data

US 2008/0101464 A1 May 1, 2008

Related U.S. Application Data

(60) Provisional application No. 60/863,199, filed on Oct. 27, 2006.

(51) Int. Cl.
*G06F 21/06* (2006.01)
(52) U.S. Cl. ........... 375/240.03; 375/240; 375/348; 375/412; 348/401; 348/402; 348/403; 348/404; 348/405; 348/406; 348/407; 348/408; 348/409; 348/410; 348/411
(58) Field of Classification Search ......... 375/240.11, 375/240.21
See application file for complete search history.

(56) References Cited

U.S. PATENT DOCUMENTS

| | | | |
|---|---|---|---|
| 6,351,568 B1 | 2/2002 | Andrew | |
| 6,356,665 B1 | 3/2002 | Lei et al. | |
| 6,611,626 B1 * | 8/2003 | de Queiroz | 382/239 |
| 6,865,668 B1 * | 3/2005 | Benes et al. | 712/300 |
| 6,885,774 B2 | 4/2005 | Ammicht et al. | |
| 6,909,811 B1 * | 6/2005 | Kajiwara et al. | 382/246 |
| 6,983,017 B2 | 1/2006 | Chen et al. | |
| 8,005,306 B2 * | 8/2011 | Kimura | 382/233 |
| 2002/0001413 A1 * | 1/2002 | Ratnakar | 382/240 |
| 2003/0123742 A1 | 7/2003 | Zhao et al. | |
| 2004/0101205 A1 * | 5/2004 | Dhavala et al. | 382/247 |
| 2004/0126018 A1 * | 7/2004 | Monro | 382/232 |
| 2004/0170335 A1 * | 9/2004 | Pearlman et al. | 382/240 |
| 2004/0184530 A1 * | 9/2004 | Cheng | 375/240.01 |
| 2005/0249283 A1 * | 11/2005 | Kajiwara et al. | 375/240.12 |

OTHER PUBLICATIONS

Song et al., "Rate control for low-bit-rate video via variable-encoding frame rates ", Apr. 2001, Circuits and Systems for Video Technology, IEEE Transactions on, vol. 11 Issue: 4, on pp. 512-521.*
M. Budagavi and M. Zhou, Video coding using compressed reference frames, ITU-T SG 16 Q6 VCEG Document VCEG-AE 19, Jan. 2007.

* cited by examiner

*Primary Examiner* — Taghi Arani
*Assistant Examiner* — Morshed Mehedi
(74) *Attorney, Agent, or Firm* — Krieger Intellectual Property, Inc.; Scott C. Krieger

(57) ABSTRACT

Embodiments of the present invention comprise systems and methods for low-complexity data compression.

20 Claims, 4 Drawing Sheets

METHODS AND SYSTEMS FOR LOW-COMPLEXITY DATA COMPRESSION

RELATED REFERENCES

This application claims the benefit of U.S. Provisional Patent Application No. 60/863,199, entitled "Methods and Systems for Frame Buffer Compression," filed on Oct. 27, 2006 by Shawmin Lei.

FIELD OF THE INVENTION

Embodiments of the present invention comprise methods and systems for low-complexity data compression.

BACKGROUND

In many modern digital image systems image frames are buffered for further image processing. In order to reduce the required memory size as well as required I/O bandwidth, compression of the buffered images may be employed. The requirements of the compression algorithm for this kind of application usually include low complexity, fixed compression ratio and high quality (e.g., visually lossless). On the other hand, the required compression ratio is usually allowed to be lower, e.g., 2 to 4 would be sufficient.

SUMMARY

Some embodiments of the present invention comprise methods and systems for low-complexity data compression. Some embodiments comprise selection or transmission of significance levels that represent data values and selection or transmission of refinement bits when a budget allows.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
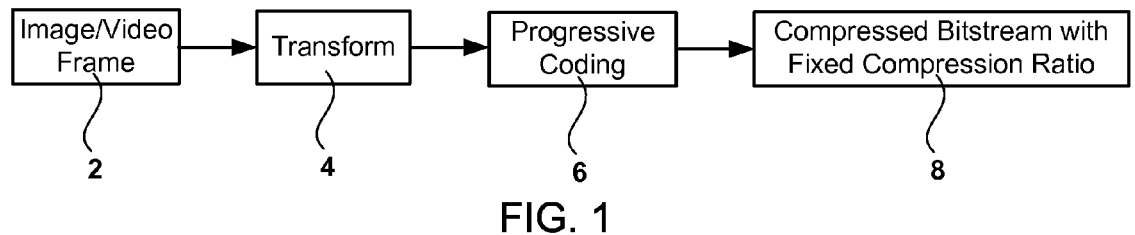
FIG. 1 is a diagram showing an exemplary encoder architecture.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Progressive (or embedded) image coding has received a lot of attention in recent years due to its quality scalability feature. Progressive (or embedded) image coding arranges a bitstream in such way that more important information is sent first. Thus, as a decoder is receiving a bitstream, it can decode an incomplete portion of the bitstream and reconstruct a rough image while gradually improving the picture quality as more bits are received. Using this feature, one can easily hit a target number of compressed bits by stopping encoding when a target number of bits is reached or by truncating an existing bitstream to a target number of bits.

Due to recent technological advances, one can achieve progressive image coding without much sacrifice of compression efficiency. This feature makes progressive image coding desirable for achieving a fixed number of compressed bits, which is one of main requirements for frame buffer compression. However, almost all existing progressive image coding methods are too complex for frame buffer compression. Some embodiments of the present invention comprise selected elements of progressive coding. In particular, some embodiments comprise, bit-plane coding, however, it is modified to make hardware implementation easier.

After the usual transform (e.g., wavelet or DCT transform) to de-correlate signals and to compact the energy to a few transform coefficients, progressive image coding typically uses a bit-plane coding approach to achieve a progressive coding feature. Bit-plane coding sends transform coefficients bit plane by bit plane, from the most significant bit plane to a less significant bit plane. These techniques are often called embedded coding because the low bit-rate bitstream is embedded in the high bit-rate bitstream. Thus, the encoding can be stopped or the bitstream can be truncated at any point and the resulting bitstream can still be decoded into an image with picture quality similar to that of any other coding method using the same number of compressed bits. This bit-plane coding, however, presents some difficulty for hardware implementation due to its multiple and variable number of scans for each coefficient.

For a frame buffer compression application or other applications, a coding unit of pixels only needs to be compressed into a fixed number of bits. Other features of progressive (or embedded) image coding are actually not necessary, e.g., to truncate bitstream at any point. In these applications, the sending order of the bit planes within the target number of compressed bits does not really matter as long as the bitstream contains all the bit planes that the target number of compressed bits can support.

In some embodiments of the present invention, the multiple and variable number of coefficient scans used in typical progressive coding may be limited to a simple 2-pass process. In the first pass, the position of the most significant non-zero bit for each coefficient may be encoded and sent. With this information, the encoder (and decoder) can determine how many refinement bits for each coefficient need to be sent in order to ensure that all the bit planes that can be supported by the target bit number are sent. In the second pass, the encoder then sends the refinement bits for each coefficient.

Some embodiments of the present invention may be described with reference to FIG. 1, which is a block diagram of an exemplary frame buffer compression encoder. In these embodiments, the encoder receives as input video frames or images 2, typically one frame at a time. These images or frames are then transformed 4. Transformation 4 may comprise color transformation, which, in some embodiments, may convert RGB components to YUV (or YcbCr) components. Transformation 4 may also comprise a spatial transform, e.g., DCT or wavelet transform. Embodiments of the present invention may also comprise progressive coding 6 that follows the transformation 4. In some embodiments, in order to facilitate easy access of a partial image, an encoder may divide an image or frame into multiple coding units, e.g., blocks or lines. The shape and size of a coding unit may be determined by the shape and size of a partial image sought by a target application. For example, it can be a line of an image, 16×16 rectangular block of pixels, or another shape of rectangular block. Compression may be performed independently for each coding unit. Each coding unit of an image may be compressed into a fixed number of bits, which may be determined by the target compression ratio.

In some exemplary embodiments, a wavelet transform with simple Haar filters may be used for the spatial transform. The wavelet transform of a coding unit may output several sub-bands of transform coefficients. In some embodiments, the coefficients of different subbands may be normalized such that the same magnitude of quantization error for different subbands will generate the same error energy (or norm) after inverse transformation.

Figure 2:
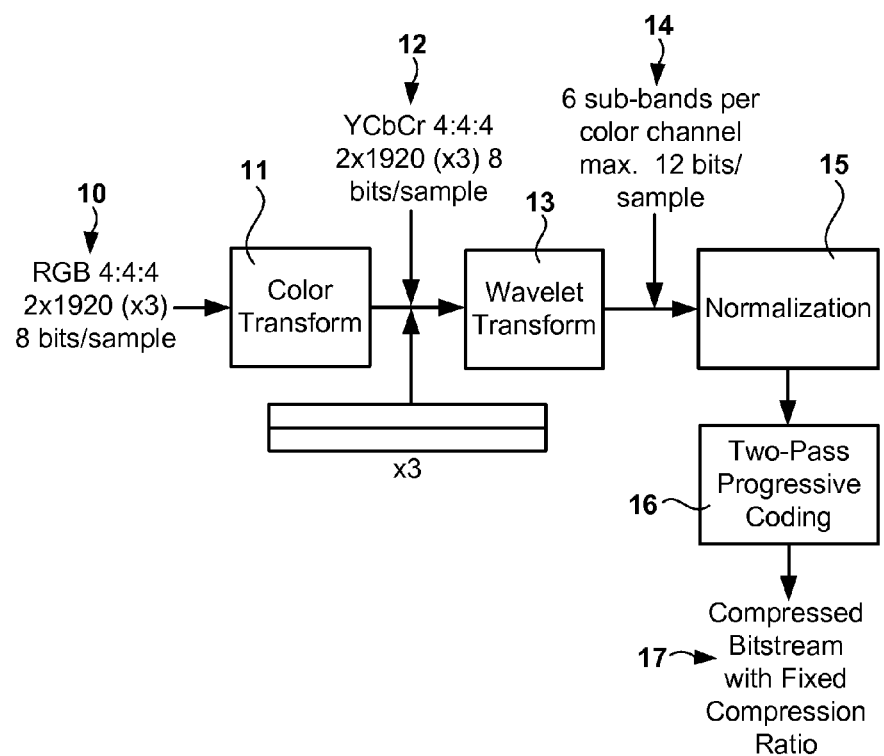
FIG. 2 is a diagram showing a more detailed exemplary encoder architecture.

Some exemplary architecture embodiments may be described with reference to FIG. 2. In these embodiments, an RGB image 10 in a 4:4:4 format is received as input. In these exemplary embodiments, a two line by 1920 sample coding unit is utilized for each color channel with an 8-bit color depth. A color transform 11 is applied to the input image 10 to convert to another color space. In these exemplary embodiments, the input image is converted to a YCbCR color space 12 in a 4:4:4 format, again with an 8-bit color sample depth. The coding units are still 2 lines by 1920 samples for each of a luminance and two color channels. These coding units are then transformed with a wavelet transform operation 13. Details of exemplary wavelet transforms for the exemplary 2-line coding units are described below. Some embodiments of the exemplary wavelet transform 13 comprise the application of Haar filters with three horizontal layers and one vertical layer. Other details of some embodiments are explained below. In these exemplary embodiments, the wavelet transformation 13 may result in coefficients 14 for 6 sub-bands per channel (luminance and color). In some embodiments, these coefficients may be represented by 12 bits per sample. These coefficients may be normalized 15 and arranged in an order that allows for scanning in a priority order or order of importance. Some normalization 15 embodiments are described in more detail below. The coefficients may then be coded 16 using embodiments of the present invention described in detail below and sent as a compressed bitstream 17.

Figure 3:
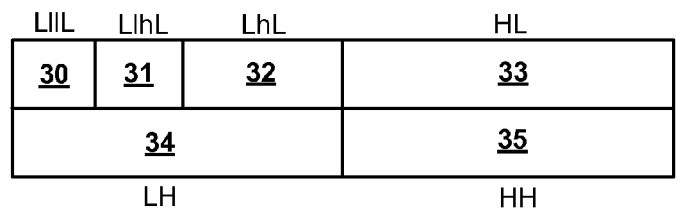
FIG. 3 is a diagram showing subbands of an exemplary wavelet transform.

Some exemplary embodiments of the present invention comprise 1-D wavelet transforms. In these embodiments, three horizontal layers and one vertical layer may be applied to two-line coding units. The resulting sub-bands 30-35 are shown in FIG. 3.

Some exemplary transform embodiments may employ a normal 1-D wavelet transform comprising Haar filters wherein: $L=A+B$ and $H=A-B$. In these embodiments, the normalization factor for both L and H coefficients is $1/\sqrt{2}$.

Some exemplary transform embodiments may employ a reduced-bit 1-D wavelet transform comprising Haar filters wherein: $L=A+B$ and $H=A-B>>1$. In these embodiments, the normalization factor for L and H coefficients are $1/\sqrt{2}$ and $\sqrt{2}$, respectively.

In some embodiments, the normalization factors for each sub-band of three horizontal layers and one vertical layer of our exemplary, reduced-bit wavelet transform comprise:

$$W_{LlhL}=1/4, W_{LlhL}=1/2, W_{LhL}=1/\sqrt{2}, W_{HL}=1, W_{HL}=1, W_{HH}=2$$

For a fixed-point implementation, normalization can be achieved with a left bit shifts as follows:

$$\text{Shift}_{LlhL}=0, \text{Shift}_{LlhL}=1, \text{Shift}_{LhL}=1.5, \text{Shift}_{HL}=2, \text{Shift}_{HL}=2, \text{Shift}_{HH}=3$$

However, because the LhL sub-band cannot be shifted by a non-integer value, this fixed point implementation cannot be executed entirely. In some embodiments, this complication can be overcome by using the following normalization shift factors in combination with a sub-band scan order re-prioritization scheme.

$$\text{Shift}_{LlhL}=0, \text{Shift}_{LlhL}=1, \text{Shift}_{LhL}=2, \text{Shift}_{HL}=2, \text{Shift}_{HL}=2, \text{Shift}_{HH}=3$$

Figure 4:
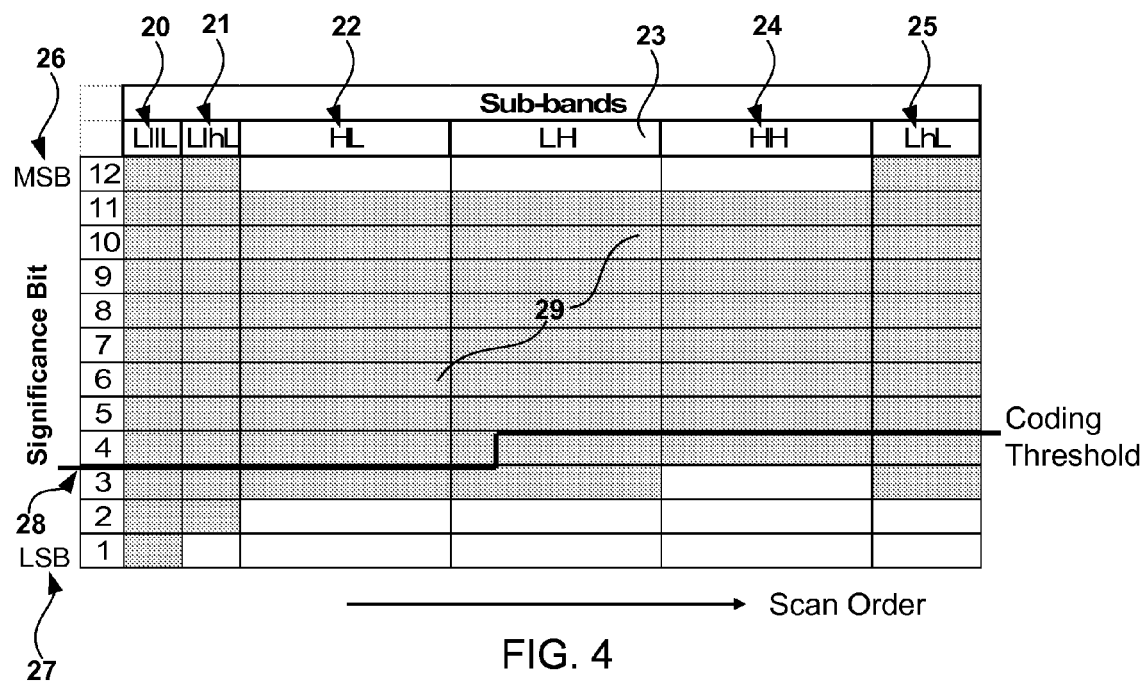
FIG. 4 is a diagram showing an exemplary transform coefficient arrangement.

In these embodiments, the LhL sub-band is shifted by two (an additional half value), but the LhL sub-band is re-prioritized in the scan order to last place, as shown in FIG. 4. In this manner, the additional "over-normalization" is compensated, at least in part, by the lower rank in the scan order.

In some alternative embodiments, a one-line coding unit may be used. In these embodiments, three layers of horizontal wavelet transform may be used resulting in 4 sub-bands. These embodiments provide lower hardware complexity and can operate line-by-line. However, coding efficiency may suffer in some applications.

Encoding

In some embodiments, as in many bit-plane progressive coding methods, the bits of each coefficient may be divided into three categories: sign bit, significance bits, and refinement bits. In these embodiments, the sign bit represents the sign of the coefficient. The significance bits include all leading zeros and the first one bit, starting from the most significant bit of the coefficient. The refinement bits are the rest of the bits, which are not a sign bit or significance bits. For example, in the 8-bit sign-magnitude binary representation, a coefficient of value −58 can be represented as "−0111010". Its sign bit can be represented by '1'. The first 2 bits, "01" (underlined), are its significance bits, and the rest of bits, "11010", are its refinement bits. In these embodiments, however, we use significance level to summarize the information of its significance bits, where significance level is defined as the position of its first '1' bit, counted from the least significant bit. For example, the significance level of −58 is 6. The significance level of a zero coefficient may be defined as 0.

Exemplary Two-Pass Embodiments

In the first pass of these methods, the significance level, and sign bit if the significance level is greater than 0, may be encoded for each coefficient. Thus, this pass may be referred to as a significance-sign pass. In some embodiments, the scan order of coefficients can be arranged from a more important coefficient to less important ones, for example, from low-frequency-subband coefficients to high-frequency-subband coefficients. The sign bit, if any, is usually close to being equally distributed. Thus, in some embodiments, it can be sent uncompressed without losing much coding efficiency. In some embodiments, the significance-level information can be compressed by any entropy coding methods, e.g., Huffman codes or arithmetic codes. In some embodiments, in order to keep the complexity low, Huffman codes may be used to compress the significance level of each coefficient independently. However, when the probability of a specific significance level (usually zero if it happens) is much greater than 0.5, some embodiments may comprise run length coding with Golomb-Rice codes to encode the run length of the consecutive coefficients with this probable significance level (usually zero), followed by a Huffman codeword to encode the significance level (usually non-zero) after the run. In some embodiments, since different subbands usually have different statistics, different Huffman tables and Golomb-Rice codes can be used for different subbands.

Golomb-Rice codes are a special family of universal variable length codes. If the run length is n, the Golomb-Rice code of order k, denoted as $GR_k$, is prefixed by the unary representation of the quotient of n divided by $2^k$ and followed by the binary representation of the remainder of n divided by $2^k$. The unary representation of a natural number i (=0, 1, 2, . . . ) is just i '0' bits followed by a '1' bit (as a delimiter). For example, the Golomb-Rice code of order 2 for the run length 7 is "0111". The first 2 bits, "01", is the unary representation of 1, which is the quotient of 7 divided by $2^2$. The last 2 bits, "11", is the binary representation of 3, which is the remainder of 7 divided by $2^2$. Thus, the order k can be adjusted to fit different probability values of the probable significance level (usually zero). In some embodiments, the larger the probability of the probable significance level, the larger the order k should be. One way to select the order k can be based on the assumption that the significance levels are independent and identically distributed with the probability of the probable significance level (usually zero) equal to q. In some embodiments, the optimal order k should satisfy the following conditions:

$$q^{2^k} \leq \phi < q^{2^{k-1}}, \text{ where } \phi = (\sqrt{5}-1)/2.$$

During the first pass, the encoder (and the decoder) may accumulate the number of compressed bits used in this pass and the histogram count for each significance level. The refinement bits may also be close to equally distributed. Thus, they may also be sent uncompressed without losing much coding efficiency. After the first pass, given the number of left compressed bits and the significance-level histogram, the number of refinement bits that can be sent for each coefficient may be determined based on the rule that the sent refinement bits should be more significant than or equally significant to the dropped refinement bits. This rule may be referred to as the bit-plane coding rule in subsequent text. In some embodiments, we can determine a significance threshold S and the number, denoted $N_S$, of coefficients that have a refinement bit with significance equal to $2^{S-1}$. The encoder and decoder may do the same calculations and should have the same numbers, S and $N_S$. Thus, the encoder and decoder can operate in sync.

In some embodiments of the present invention, during the second pass of these methods, the refinement bits that fit within a bit budget or other constraint may be scanned and transmitted. Data from the first pass may be used to determine how many coefficients have refinement bits at each significance level. The significance level at which the bit budget is exceeded may then be determined and any refinement bits with significance greater than this level may be scanned and transmitted. Refinement bits with a significance level equal to that at which the bit budget is exceeded may be scanned in scan order until the bit budget is full. The rest of the refinement bits at that significance may be discarded. Other methods may also be used to determine a cutoff point at which the refinement bits will no longer be transmitted.

In some exemplary embodiments, in the refinement pass, the coefficients may be scanned in the order of importance. In this order, before the number of coefficients that have a refinement bit with significance equal to or greater than $2^{S-1}$ is reached, each coefficient's refinement bits that have significance greater than or equal to $2^{S-1}$ may be selected or sent. The first $N_S$ coefficients that have a refinement bit with significance equal to $2^{S-1}$ are not necessarily, and usually not, the first $N_S$ scanned coefficients because those coefficients may not have any refinement bit with significance equal to $2^{S-1}$. This may happen when the significance level of a coefficient is less than (S+1) or when the bit with the significance does not exist due to a normalization process (usually done by shifting up a certain number of bits for each subband).

After the number of the coefficients that have a refinement bit with significance equal to $2^{S-1}$ is reached, each coefficient's refinement bits that have significance greater than $2^{S-1}$ are sent. These embodiments may be explained with reference to FIG. 4. In these exemplary embodiments, there are six subbands, denoted as LllL, LlhL, LhL, HL, LH, and LL bands 20-25, which are the result of one layer of vertical and three layers of horizontal wavelet transforms. The width of each subband is proportional to the number of coefficients in the subband. The vertical direction represents the bits of each coefficient, from the most significant bit (MSB, Bit 12) 26 on the top to the least significant bit (LSB, Bit 1) 27 on the bottom. (The original image has 8 bits per component per sample.) The shaded cells 29 represent possible bit locations for an exemplary embodiment. For example, according to FIG. 4, the coefficients in subband HH do not have any bits in Bit 1-3 due to normalization, and they do not have Bit 12 either because the precision of that value is not that high. Note that sign bits are not shown in the figure. The significance threshold 28, S, in this example is 4.

The decoding process may also have two passes. In the first pass (the significance-level pass) the decoder decodes the significance level and possible sign bit of each coefficient. In the meantime, the decoder accumulates the number of used bits and the significance-level histogram, the same as in the encoder. After the first pass, the decoder calculates the S and $N_S$ just as in the encoder. According to those two numbers, the decoder can pick the right number of refinement bits from the compressed bitstream for each coefficient in the second pass (refinement pass). The decoded value of a coefficient can be formed by assuming that the unsent bits are zeros.

Exemplary Three-Pass Embodiments

Some two-pass embodiments may suffer from coding inefficiency when the compression ratio gets much higher than 2:1 or when the images have very complicated random texture. In these cases, the significance threshold becomes too high and encoding low significance levels becomes inefficient because a significant number of refinement bits that have greater significance (than the low significance levels) cannot be sent. When this occurs, other embodiments, described below, may provide higher efficiency. In some embodiments, the encoder and decoder may automatically switch between variations of two-pass and three-pass embodiments based on the compression ratio or the image characteristics.

Some embodiments of the present invention comprise methods that employ three passes. In some exemplary embodiments, the significance level of every coefficient does not need to be sent. These embodiments first estimate, for each coding unit (e.g., block, line, etc.), what significance threshold can be supported. This threshold can be estimated from the significance-level histogram and may be referred to as the estimated significance threshold, $S_{est}$. In these embodiments, the plan is to encode the significance levels and refinement bits that are greater than or equal to the estimated significance threshold, $S_{est}$. The significance levels lower than $S_{est}$ may be lumped together and encoded as zeros. Thus, in this first pass, which may be called the significance-histogram pass, the encoder may accumulate the significance-level histogram from all coefficients.

After the first pass, an iterative algorithm may be used to estimate the significance threshold that can be supported. The iterative algorithm may start by assuming $S_{est}=0$. Using appropriate Huffman codebooks (and Golomb-Rice codes, if run-length coding is needed) the number of bits needed to encode the significance-level information (with lumped zero significance level when $S_{est}>0$) can be estimated from the significance-level histogram. If the run-length coding is not used, this number can be determined exactly from the used Huffman codebooks and significance-level histogram. The exact number of refinement bits that are greater than or equal to $S_{est}$ may also be determined from the significance-level histogram. By comparing to the target number of bits for a coding unit, we can determine if the estimated significance threshold $S_{est}$ can be supported. If yes, the iterative algorithm stops. If not, $S_{est}$ is incremented by 1 and the algorithm is repeated. When this occurs, the number of possible significance levels decrements and the probability for lumped zero significance level increases as $S_{est}$ increments. Thus, the Huffman codebooks (and Golomb-Rice codes, if run-length coding is needed) should be changed accordingly. In some embodiments, the determined value of $S_{est}$ is sent at the beginning of the bitstream to signal the decoder which Huffman codebooks (and Golomb-Rice codes, if any) should be used.

Without the histogram of the lumped-zero run lengths, we do not know exactly the total number of bits used by run length coding, but it can be estimated in some embodiments. For each value of $S_{est}$, it is predetermined whether the lumped zeros will be coded with run length coding or not. If the run length coding is used, the order k for Golomb-Rice codes is also predetermined. Given k, the average run length should be around $2^{k+1}$. Thus, when run-length coding is used, for each non-zero symbol, we add to the total number of estimated coded bits its Huffman length, 1 (for sign bit), and k+1 (for the last k+1 bits of $GR_k$ codes, since a non-zero symbol is always preceded by a run-length code). And for each lumped zero symbol, we add a fractional number of bits, $C/2^k$, to the total number of estimated coded bits. C is a constant that can be determined by experimentation and, in some embodiments, may fall in the range of about 0.7 to about 0.8.

In the second pass, which may be referred to as the significance-sign pass, the encoder may encode the possibly-modified significance level of each coefficient using the appropriate Huffman codebooks (and Golomb-Rice codes, if any) determined by $S_{est}$. The significance level may be modified to zero if it is less than the estimated significance threshold, $S_{est}$. The sign bit of each coefficient that has significance level greater than or equal to $S_{est}$ may also be sent right after its significance level.

After the second pass, a process similar to the process between the first pass and the second pass of two-pass embodiments described above may be followed. Based on the number of bits left and the significance-level histogram, the encoder can determine how many refinement bits can be sent for each coefficient based on the bit-plane coding rule. Similar to the previously-described embodiments, the encoder can determine the significance threshold S for the refinement bits, now called the refinement-significance threshold for these embodiments. If $S \geq S_{est}$, everything is similar to the two-pass embodiments. However, if $S<S_{est}$, it means that the target number of compressed bits is larger than the number of bits required to code all the bits with significance level greater than or equal to $S_{est}$.

When this occurs, in some embodiments, the available extra bits may be used to further refine the coefficients that have been signaled with significance level greater than 0 in the second pass, but ignore the coefficients that have been signaled as zeros in the second pass. This approach may compromise the bit-plane coding rule slightly since the refinement of the coefficients with significance level less than $S_{est}$ but greater than 0 is ignored. However, the refinement significance threshold S and the number of coefficients that have a refinement bit with significance equal to $2^{S-1}$, $N_S$, can be determined by using the information sent in the second pass, which is available in both encoder and decoder. Thus, the processes after the significance-level pass are very similar to the processes after the significance-level pass of the previously-described two-pass embodiments.

In other embodiments, all coefficients may be further refined, including those having significance level less than $S_{est}$ but greater than 0. The refinement of the lumped-zero coefficients may include significance bits, a possible sign bit, and possible refinement bits. To allow the encoder to calculate the significance threshold, S, from the significance-level histogram, including the histogram for the significance levels less than $S_{est}$, the magnitude bits that are less than $S_{est}$ may be sent, and any sign bits if the any sent magnitude bit is 1, for the refinement of a lumped-zero coefficient.

Using this simple explicit coding method, the encoder can determine the refinement significance threshold S and $N_S$, the number of bits that that can be used to send the bits of significance S. Note that $N_S$ includes the count of the possible sign bits of the coefficients with significance level equal to S if $S<S_{est}$. When $S<S_{est}$, the encoder needs to use the information on the histogram for the significance levels less than $S_{est}$ to obtain S and $N_S$. Since this histogram information is not available for the decoder, in some embodiments the information on S and $N_S$ may be included in the bitstream right after the compressed bits generated from the second pass.

Given S and $N_S$, the third pass of this method, which may be referred to as the refinement pass, is similar to the refinement pass of the previously-described two-pass embodiments, except that $N_S$ needs to include the count of the possible sign bits of the coefficients with significance level equal to S if $S<S_{est}$. Before the number of the sent bits with significance S reaches $N_S$, for each coefficient with significance level greater than or equal to $S_{est}$, its refinement bits with significance greater than or equal to $2^{S-1}$ may be sent, and for each coefficient with significance level less than $S_{est}$, the magnitude bits with significance level less than $S_{est}$ and greater than or equal to S may be sent, followed by its sign bit if any of the magnitude bits is 1. In some embodiments, when the number of the sent bits with significance S reaches $N_S$, S can be decremented by 1 and the refinement pass can continue.

The decoding process of these embodiments may comprise two passes, a significance-level pass and a refinement pass. The decoder first obtains $S_{est}$ from the bitstream. In the first pass, i.e., the significance-level pass, the decoder decodes the significance level and possible sign bit of each coefficient. In the meantime, the decoder accumulates the number of used bits and significance-level histogram, the same as in the encoder. After the first pass, the decoder can determine if S is less than $S_{est}$ or not. If yes, the decoder can decode S and $N_S$ from the bitstream. If not, the decoder can calculate S and $N_S$ similar to the previously-described methods.

In some alternative embodiments, the encoder may include the information on S and $N_S$ in the bitstream and the decoder may obtain the information from the bitstream regardless of the value S. After obtaining S and $N_S$, the decoder can pick the right number of refinement bits or explicit coded bits from the bitstream for each coefficient in the second pass, i.e., the refinement pass. The decoded value of a coefficient can be formed by assuming that the unsent bits are zeros.

Some embodiments of the present invention comprise functions similar to those of the three-pass methods described above, but with the first and second passes merged into a single pass. In these embodiments, the first pass (the significance-histogram pass) and the second pass (the significance-level pass) of the three-pass method described above can be merged into a single pass by a predetermined value of $S_{est}$. In some embodiments, $S_{est}$ may be set empirically according to the target compression ratio. In some embodiments, $S_{est}$ may be estimated with the $S_{est}$ and S values of previous coding units, with consideration of the target compression ratio. For example, $S_{est}$ can be set to the S value of the previous coding unit. This change may only affect the encoder and the decoder may remain the same as described above.

Some embodiments of the present invention may comprise the functions of the above-described three-pass embodiments, but with the significance-level pass and the refinement pass merged. In these embodiments, if only Huffman codes are used (no run-length codes), the encoder can calculate the number of bits needed in the significance-level pass and the S and $N_S$ needed for the refinement pass right after collecting significance-level histogram data in the first pass (significance-histogram pass). Thus, the significance-level pass and the refinement pass can be merged for both the encoder and decoder.

In these embodiments, after the first pass, the encoder may calculate exactly the S and $N_S$ that the target number of compressed bits can support. The information about S and $N_S$ may then be encoded in the bitstream. In the second pass, for each coefficient, the encoder may first encode the significance level of the coefficient by the appropriate Huffman codebook, send its sign bit if the significance level is greater than 0, and send the refinement bits with significance greater than or equal to $2^{S-1}$ before $N_S$ is reached or the refinement bits with significance greater than $2^{S-1}$ after $N_S$ is reached. Thus, all the information about a coefficient may be located in a consecutive segment of the bitstream. Note that since S can be calculated exactly, there is no need to refine the coefficients with the lumped-zero significance level by explicit coding.

The decoder of these embodiments may have only one pass. It first decodes S and $N_S$ from the bitstream. Based on S and $N_S$, it decodes each coefficient in just one pass.

Figure 5:
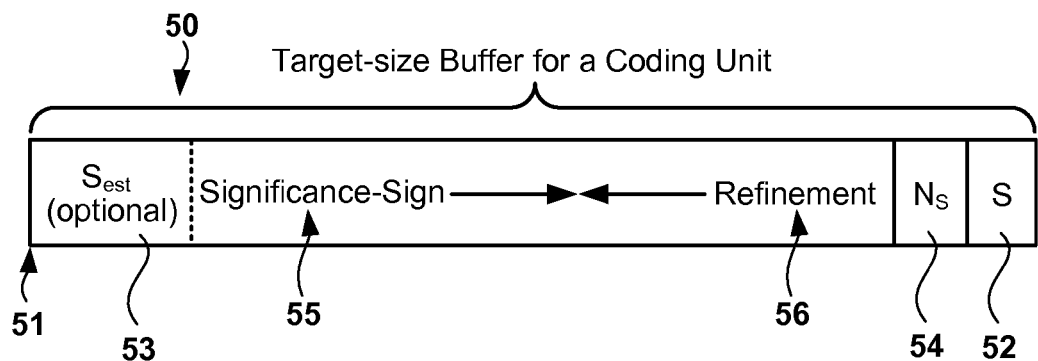
FIG. 5 is a diagram showing an exemplary buffer structure.

In some embodiments of the present invention, described with reference to FIG. 5, the bitstream generated by the encoder may be arranged so as to enable merging the significance-level pass and the refinement pass in the decoder. In these embodiments, a target-size buffer 50 is established with a first end 51 and a second end 52. In some embodiments comprising three-pass processes, $S_{est}$ 53 may be written at one end 51 of the encoder. In other embodiments, $S_{est}$ 53 may not be used.

Significance levels and sign bits 55 may be written to the first end 51 of the buffer while, S and $N_S$ 52 and 54 may be written to the second end 52 of the buffer followed by refinement bits 56 in backward order. With this arrangement of the bitstream, the decoder can read (and decode) the significance-sign bits as well as the refinement bits for each coefficient at the same time. Thus, the decoding of significance-sign bits and refinement bits of each coefficient can be done in just one pass.

Figure 6:
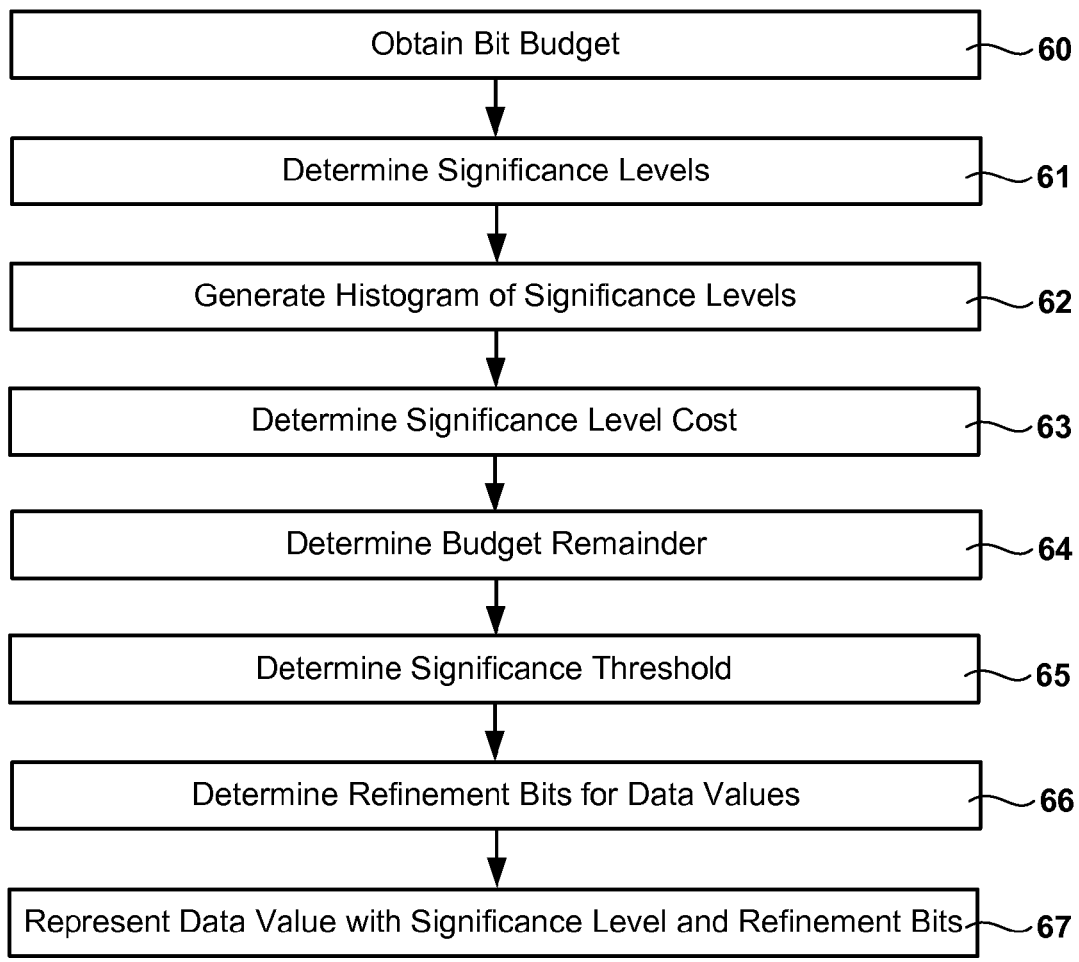
FIG. 6 is a chart showing an exemplary embodiment comprising a significance threshold.

Some embodiments of the present invention may be described in relation to FIG. 6. In these embodiments, a data representation or bit budget is obtained 50. This budget may correspond to a buffer size, a bandwidth constraint or some other data size limitation. Significance levels may then be determined 51 for code values in the data set. In some embodiments, these code values may be transform coefficients, normalized transform coefficients, normalized transform coefficient arranged in a scan order or other data values. In some embodiments, these data values may correspond to wavelet transform coefficients for an image, wherein the data set represents the image.

A histogram may then be generated 52 from the significance levels based on a frequency-of-occurrence of each significance level. Knowing the frequency-of-occurrence of each significance level, a significance-level cost may be determined 53. This significance level cost may represent the number of bits required to represent or encode the significance levels. A budget remainder 54 may then be determined. In some embodiments, the budget remainder 54 may be calculated by subtracting the significance level cost 53 from the bit budget 50.

The budget remainder 54 may now be used to determine which unused bits will be used for representing the data values. This may be determined by finding a significance threshold 55, which may designate the limit between bits with a high enough significance to fit within the remaining budget and those that so not fit. Refinement bits 56 may be selected using the significance threshold 55 and used to represent 57 data values along with the significance levels 51.

Figure 7:
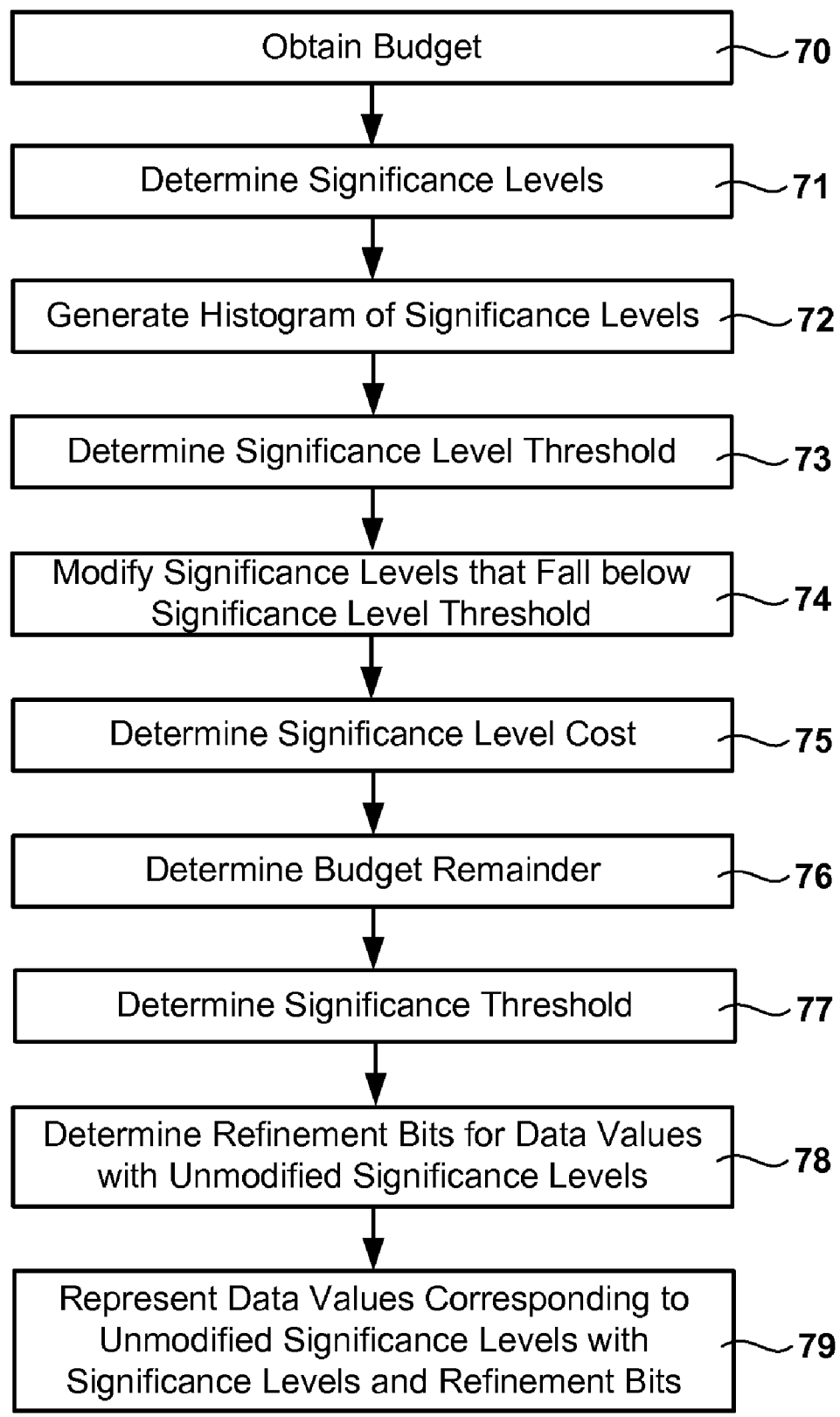
FIG. 7 is a chart showing an exemplary embodiment comprising a significance threshold and a significance-level threshold.

Some embodiments of the present invention may be described with reference to FIG. 7. In these embodiments, a data representation or bit budget is obtained 60. This budget may correspond to a buffer size, a bandwidth constraint or some other data size limitation. Significance levels may then be determined 61 for code values in the data set. In some embodiments, these code values may be transform coefficients, normalized transform coefficients, normalized transform coefficient arranged in a scan order or other data values. In some embodiments, these data values may correspond to wavelet transform coefficients for an image, wherein the data set represents the image.

A histogram may then be generated 62 from the significance levels based on a frequency-of-occurrence of each significance level. A significance level threshold 63 may then be determined based on the bit budget 60 and the significance level histogram data 62. Any significance levels that do not meet threshold requirements may be modified 64. In some embodiments, these significance levels may be reset to zero. A significance level cost 65 may then be determined and a budget remainder 66 may be calculated based on the budget and the significance-level cost. A significance threshold 67 may then be determined with the budget remainder 66 and the histogram 62. The significance threshold 67 may then be used to determine which refinement bits 68 will be selected to further refine data values corresponding to unmodified significance levels. These refinement bits 68 and unmodified significance levels 61 may then be used to represent 69 data values.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for selecting data to represent a data set comprising a plurality of data values wherein each of said data values is represented by a plurality of bits arranged in order of significance, said method comprising:
   a) obtaining a data-representation budget using a processor and a memory;
   b) determining a significance level for each of said data values;
   c) generating a histogram of said significance levels;
   d) determining a significance-level cost to represent said significance levels;
   e) determining a budget remainder based on said data-representation budget and said significance-level cost;
   f) determining a significance threshold using said budget remainder and said significance-level histogram;
   g) determining refinement bits for each of said data values based on said significance threshold; and
   h) representing one of said data values with said significance level and said refinement bits corresponding to said one of said data values.

2. A method as described in claim 1 further comprising writing said significance level and said refinement bits corresponding to said one of said data values to a buffer, wherein said significance level is written from one end of said buffer and said refinement bits are written from the other end of said buffer.

3. A method as described in claim 1 further comprising determining a sign bit for each of said data values and determining a sign-bit cost, wherein said budget remainder is further based on said sign-bit cost and wherein said data values are further represented by said sign bit.

4. A method as described in claim 1 wherein said data representation budget corresponds to a buffer size.

5. A method as described in claim 1 wherein said significance level represents the position of the most significant bit value equal to one in a corresponding data value.

6. A method as described in claim 1 wherein said significance-level cost is based on encoded significance levels.

7. A method as described in claim 6 wherein said encoded significance levels are generated by entropy encoding of said significance levels.

8. A method as described in claim 1 wherein said data values are transform coefficients.

9. A non-transitory computer-readable medium comprising instructions instructing a processor to execute a method for selecting data to represent a data set comprising a plurality of data values wherein each of said data values is represented by a plurality of bits arranged in order of significance, said method comprising:
   a) obtaining a data-representation budget;
   b) determining a significance level for each of said data values;
   c) generating a histogram of said significance levels;
   d) determining a significance-level threshold based on said data-representation budget and said significance-level histogram;
   e) modifying said significance levels which fall below said significance-level threshold;
   f) determining a significance-level cost to represent said significance levels that have not been modified and said modified significance levels;
   g) determining a budget remainder based on said data-representation budget and said significance-level cost;
   h) determining a significance threshold using said budget remainder and said significance-level histogram;
   i) determining refinement bits for said data values corresponding to said significance levels that have not been modified, said determining based on said significance threshold; and
   j) representing one of said data values corresponding to said significance levels that have not been modified, wherein said representing comprises an expression of said significance level and said refinement bits corresponding to said one of said data values.

10. A non-transitory computer-readable medium as described in claim 9 wherein said method further comprises representing one of said data values corresponding to said modified significance levels with a zero value significance level.

11. A non-transitory computer-readable medium as described in claim 9 wherein said method further comprises representing one of said data values corresponding to said modified significance levels with a pre-modified significance level when said pre-modified significance level is greater than said significance threshold.

12. A non-transitory computer-readable medium as described in claim 11 wherein said method further comprises determining refinement bits for said data values corresponding to said modified significance levels, said determining based on said significance threshold and representing one of said data values corresponding to said modified significance levels with a pre-modified significance level and said refinement bits when said pre-modified significance level is greater than said significance threshold.

13. A non-transitory computer-readable medium as described in claim 9 wherein said method further comprises determining a sign bit for each of said data values corresponding to said significance levels that have not been modified and determining a sign-bit cost, wherein said budget remainder is further based on said sign-bit cost, and wherein said data values corresponding to said significance levels that have not been modified are further represented by said sign bit.

14. A non-transitory computer-readable medium as described in claim 9 wherein said data-representation budget corresponds to a buffer size.

15. A non-transitory computer-readable medium as described in claim 9 wherein said significance level represents the position of the most significant bit value equal to one in a corresponding data value.

16. A non-transitory computer-readable medium as described in claim 9 wherein said significance-level cost is based on encoded significance levels that have not been modified and modified significance levels.

17. A non-transitory computer-readable medium as described in claim 16 wherein said encoded significance levels are generated by entropy encoding of said significance levels that have not been modified and modified significance levels.

18. A non-transitory computer-readable medium as described in claim 9 wherein said data values are transform coefficients.

19. A non-transitory computer-readable medium comprising instructions instructing a processor to execute a method for reconstructing encoded data, said method comprising:
   a) determining a plurality of significance levels from said encoded data;
   b) generating a histogram of said significance levels;
   c) determining a significance-level cost to represent said significance levels;

d) determining the size of a refinement-bit portion of said encoded data based on said significance-level cost and the size of said encoded data;
e) determining a significance threshold using the size of said refinement-bit portion and said significance-level histogram;
f) determining refinement bits for each of said data values based on said significance threshold; and
g) reconstructing data values based on said significance levels and said refinement bits.

20. A non-transitory computer-readable medium as described in claim 19 wherein said data values are transform coefficients.

* * * * *